United States Patent
Zheng et al.

(10) Patent No.: US 11,840,635 B2
(45) Date of Patent: Dec. 12, 2023

(54) FIXER FLUIDS

(71) Applicant: Hewlett-Packard Development Company, L.P., Spring, TX (US)

(72) Inventors: Jie Zheng, San Diego, CA (US); Dennis Z. Guo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 17/435,720

(22) PCT Filed: Oct. 11, 2019

(86) PCT No.: PCT/US2019/055947
§ 371 (c)(1),
(2) Date: Sep. 2, 2021

(87) PCT Pub. No.: WO2021/071522
PCT Pub. Date: Apr. 15, 2021

(65) Prior Publication Data
US 2022/0154027 A1 May 19, 2022

(51) Int. Cl.
| | |
|---|---|
| C09D 11/54 | (2014.01) |
| B41J 3/407 | (2006.01) |
| B41M 7/00 | (2006.01) |
| C09D 11/033 | (2014.01) |
| C09D 11/102 | (2014.01) |

(Continued)

(52) U.S. Cl.
CPC ............ *C09D 11/54* (2013.01); *B41J 3/4078* (2013.01); *B41M 7/0018* (2013.01); *C09D 11/033* (2013.01); *C09D 11/102* (2013.01); *C09D 11/107* (2013.01); *C09D 11/38* (2013.01); *C09D 11/40* (2013.01); *D06P 1/525* (2013.01); *D06P 1/5278* (2013.01); *D06P 1/5285* (2013.01);

(Continued)

(58) Field of Classification Search
CPC ..... B41J 3/4078; B41M 7/0018; C09D 11/54; C09D 11/033; C09D 11/102; C09D 11/107; C09D 11/38; C09D 11/40; D06P 1/525; D06P 1/5278; D06P 1/5285; D06P 5/002; D06P 5/2072; D06P 5/30
See application file for complete search history.

(56) References Cited

U.S. PATENT DOCUMENTS

| 5,389,132 A | 2/1995 | Davulcu et al. |
|---|---|---|
| 5,958,121 A | 9/1999 | Lin |

(Continued)

FOREIGN PATENT DOCUMENTS

| DE | 60109196 | 1/2006 |
|---|---|---|
| WO | 2009034394 | 3/2009 |

(Continued)

OTHER PUBLICATIONS

Khan, Pigment Ink Formulation, Tests and Test Methods for Pigmented Textile Inks, Chemistry and Materials Research, ISSN 2224-3224, vol. 8, No. 9, 2016, pp. 78-86.

*Primary Examiner* — Thinh H Nguyen
(74) *Attorney, Agent, or Firm* — HP Inc. Patent Department

(57) ABSTRACT

A fixer fluid can include a fixer vehicle with water, an NH-type or N-alkylated lactam co-solvent, and a phosphate ester surfactant. The fixer fluid can further include from 0.5 wt % to 12 wt % an azetidinium-containing polyamine polymer dispersed in the fixer vehicle.

15 Claims, 2 Drawing Sheets

300

310 — jetting a fixer fluid onto a fabric substrate, wherein the fixer fluid comprises a fixer vehicle including water, an NH-type or N-alkylated lactam co-solvent, and a phosphate ester surfactant, wherein the fixer fluid further comprises from 0.5 wt% to 12 wt% an azetidinium-containing polyamine polymer dispersed in the fixer vehicle 320 — jetting an ink composition onto the fabric substrate in contact with the fixer fluid, wherein the ink composition includes an ink vehicle, pigment, and polymeric binder

(51) Int. Cl.

| | | |
|---|---|---|
| *C09D 11/107* | (2014.01) | |
| *C09D 11/38* | (2014.01) | |
| *C09D 11/40* | (2014.01) | |
| *D06P 1/52* | (2006.01) | |
| *D06P 5/00* | (2006.01) | |
| *D06P 5/20* | (2006.01) | |
| *D06P 5/30* | (2006.01) | |

(52) U.S. Cl.
CPC ............ *D06P 5/002* (2013.01); *D06P 5/2072* (2013.01); *D06P 5/30* (2013.01)

(56) References Cited

U.S. PATENT DOCUMENTS 6,197,880 B1 * 3/2001 Nigam .................. D06P 1/5278
524/556

| | | |
|---|---|---|
| 6,291,023 B1 | 9/2001 | Nigam |
| 7,159,975 B2 | 1/2007 | Yue |
| 7,311,393 B2 | 12/2007 | Taguchi et al. |
| 7,462,228 B2 | 12/2008 | Ohno et al. |
| 9,163,154 B2 | 10/2015 | Abelovski |
| 2005/0065235 A1 | 3/2005 | Bauer |
| 2005/0225615 A1 | 10/2005 | Sader et al. |
| 2016/0230334 A1 | 8/2016 | Oki et al. |
| 2016/0312404 A1 | 10/2016 | Pan et al. |
| 2018/0251650 A1 | 9/2018 | Xue et al. |

FOREIGN PATENT DOCUMENTS

| | | |
|---|---|---|
| WO | 2013150265 | 10/2013 |
| WO | 2018/137859 A1 | 8/2018 |

* cited by examiner

FIXER FLUIDS

BACKGROUND

Inkjet printing has become a popular way of recording images on various media. Some of the reasons include low printer noise, variable content recording, capability of high speed recording, and multi-color recording. This can be obtained at a relatively low cost to consumers. As the popularity of inkjet printing increases, the types of use also increase providing demand for new ink compositions. In one example, textile printing can have various applications including the creation of signs, banners, artwork, apparel, wall coverings, window coverings, upholstery, pillows, blankets, flags, tote bags, clothing, etc.

DETAILED DESCRIPTION

Figure 1:
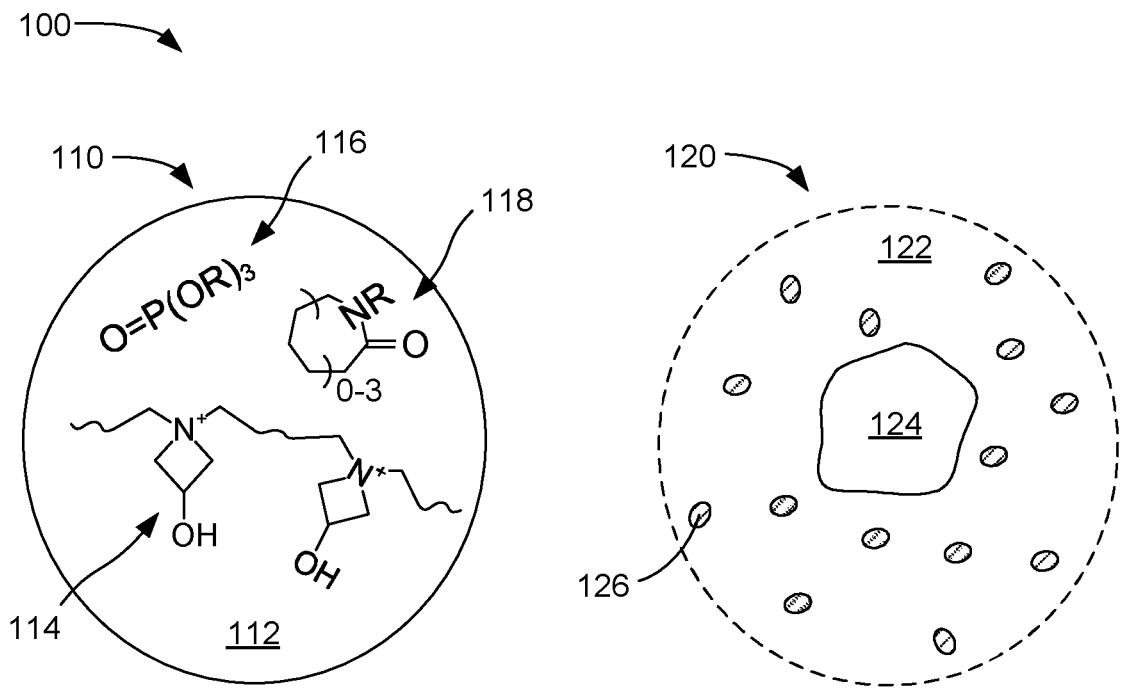
FIG. 1 schematically represents an example fixer fluid, as well as an example fluid set including an ink composition and the fixer fluid in accordance with the present disclosure.

In accordance with an example of the present disclosure, a fixer fluid includes a fixer vehicle having water, an NH-type or N-alkylated lactam co-solvent, and a phosphate ester surfactant. The fixer fluid further includes from 0.5 wt % to 12 wt % an azetidinium-containing polyamine polymer dispersed in the fixer vehicle. In one example, the azetidinium-containing polyamine polymer can include from 2 to 12 carbon atoms between individual amine groups. In another example, the azetidinium-containing polyamine polymer can have a molar ratio of crosslinked or uncrosslinked azetidinium groups to amine groups from 0.1:1 to 10:1. In other examples, the fixer fluid can have an initial viscosity from 1.5 cP to 15 cP at 25° C. and/or a pH from 2 to less than 7. The NH-type or N-alkylated lactam co-solvent can, in some examples, include a C1 to C4 alkylated lactam co-solvent. The phosphate ester surfactant can include a phosphate ester of a C10 to C20 alcohol, a polyethylene glycol oleyl mono phosphate, a polyethylene glycol oleyl diphosphate, an oleth-based phosphate, or a mixture thereof.

In another example, a fluid set for textile printing includes an ink composition including an ink vehicle, pigment, and polymeric binder. In this example, the fluid set also includes a fixer fluid having a fixer vehicle including water, an NH-type or N-alkylated lactam co-solvent, and a phosphate ester surfactant. The fixer fluid in this example also includes from 0.5 wt % to 12 wt % an azetidinium-containing polyamine polymer dispersed in the fixer vehicle. In one example, the azetidinium-containing polyamine polymer can include from 2 to 12 carbon atoms between individual amine groups. In another example, the azetidinium-containing polyamine includes from 3 to 8 carbon atoms between individual azetidinium groups and secondary or tertiary amine groups positioned along a backbone of the azetidinium-containing polyamine. The fixer fluid can have an initial viscosity from 1.5 cP to 15 cP at 25° C. and/or a pH from 2 to less than 7. In other examples, the NH-type or N-alkylated lactam co-solvent can include the N-alkylated lactam co-solvent, e.g., C1 to C4 N-alkylated lactam co-solvent; the phosphate ester surfactant can include a phosphate ester of a phosphate ester of a C10 to C20 alcohol, a polyethylene glycol oleyl mono phosphate, a polyethylene glycol oleyl diphosphate, an oleth-based phosphate, or a mixture thereof; or both can be present with these formulations. The polymeric binder in the ink composition can include polyurethane particles, (meth)acrylic latex particles, or a combination thereof, for example.

In another example, a method of textile printing includes jetting a fixer fluid onto a fabric substrate, wherein the fixer fluid includes a fixer vehicle including water, an NH-type or N-alkylated lactam co-solvent, and a phosphate ester surfactant, and wherein the fixer fluid further includes from 0.5 wt % to 12 wt % an azetidinium-containing polyamine polymer dispersed in the fixer vehicle. In this example, the method also includes jetting an ink composition onto the fabric substrate in contact with the fixer fluid, wherein the ink composition includes an ink vehicle, pigment, and polymeric binder. The fixer fluid and ink composition can be applied in any order. In one example, the fabric substrate having the fixer fluid and the ink composition applied thereto can be heated to a temperature from 80° C. to 200° C. for a period from 5 seconds to 10 minutes. In other examples, the NH-type or N-alkylated lactam co-solvent can include the N-alkylated lactam co-solvent, e.g., C1 to C4 N-alkylated lactam co-solvent; the phosphate ester surfactant can include a phosphate ester of a phosphate ester of a C10 to C20 alcohol, a polyethylene glycol oleyl mono phosphate, a polyethylene glycol oleyl diphosphate, an oleth-based phosphate, or a mixture thereof; or both can be present with these formulations.

In addition to the examples described above, the fixer fluids, the fluid sets, and the methods of printing will be described in greater detail below. It is also noted that when discussing the fixer fluid, the fluid sets, or methods of printing described herein, these relative discussions can be considered applicable to the other examples, whether or not they are explicitly discussed in the context of that example. Thus, for example, in discussing an azetidinium-containing polyamine polymer relative to the fixer fluid, such description is also relevant to the fluid set and the methods of printing described herein, and vice versa.

Fixer Fluids

As also shown in FIG. 1, a fixer fluid 110 is shown, which can include an azetidinium-containing polyamine 114 dispersed in a fixer vehicle 112. As the azetidinium-containing polyamines tend to be less stable in basic environments, in one example, the pH of the fixer fluid can be from 2 to less than 7, from 2 to 6, from 2 to 5, from 2 to 4, or from 3 to 6, or from 3 to 5, for example. pH can be measured using a pH meter from Fisher Scientific (Accumet XL250). The fixer vehicle in this example can include water, a phosphate ester surfactant 116, and an NH-type or N-alkylated lactam co-solvent 118. Notably, there is an R group shown on the phosphate ester surfactant and an R groups shown on the NH-type or N-alkylated lactam co-solvent, which have different possible substituents. These compounds will be shown and described in greater detail hereinafter, and thus these diagrammatic representations should not be considered as limiting.

As mentioned, the fixer vehicle 112 can include water, and typically, the fixer fluid is an aqueous fixer fluid with a predominant concentration of water. For example, the water content can be present in the fixer fluid at from 60 wt % to 97.5 wt %, from 70 wt % to 95 wt %, from 80 wt % to 95 wt %, or from 85 wt % to 97.5 wt %. In some specific examples, in addition to the other vehicle components shown in FIG. 1, namely the phosphate ester surfactant 116 and the NH-type or N-alkylated lactam co-solvent 118, the fixer vehicle can in some instances include other components, such as other organic co-solvent(s), other surfactants, biocide, or any of a number of other fluids that may enhance the performance of the fixer fluid, such as in relation to printability, kogation, decap, drop weight, drop velocity, or the like. If other organic co-solvents are used, examples may include polar solvents, such as alcohols, amides, esters, ketones, and/or ethers, etc. In additional detail, solvents that can be used can include aliphatic alcohols, aromatic alcohols, diols, glycol ethers, polyglycol ethers, formamides, acetamides, and/or long chain alcohols, etc. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, substituted or unsubstituted formamides, and/or substituted or unsubstituted acetamides, etc. More specific examples of organic solvents can include glycerol, dimethyl sulfoxide, sulfolane, glycol ethers, alkyldiols such as 1,2-hexanediol, and/or ethoxylated glycerols such as LEG-1, etc. If other lactam co-solvents are included other than the NH-type or N-alkylated lactam co-solvent(s), they may be included at concentrations that do not reduce the effectiveness of the NH-type or N-alkylated lactam co-solvent(s), particularly as it relates to kogation performance.

As mentioned, the fixer vehicle in accordance with examples herein can include a phosphate ester surfactant 116. Some example phosphate ester surfactants are sold under the trade name Crodafos™, available from Croda International PLC (United Kingdom). These surfactants can be oleth-based phosphate surfactants, such as Crodafos™ N3A (oleth-3 phosphate), Crodafos™ N5A (oleth-5 phosphate), Crodafos™ N10A (oleth-10 phosphate), as well as others. The phosphate ester surfactant can contribute to good kogation performance and other printability performance issues, including without limitation, performance with respect to fluid ejector nozzle health, drop ejection weight, drop ejection velocity, etc. The phosphate ester surfactant can, for example, provide some passivation to the thermal resistor and/or can act to clean the thermal resistor surface after firing in the context of thermal fluid ejection, e.g., inkjet pen ejection. The phosphate ester surfactant can be included in the fixer fluid at from 0.1 wt % to 3 wt %, from 0.2 wt % to 2 wt %, or from 0.3 wt % to 1 wt %, for example.

In one specific example, the phosphate ester can have the structure shown in Formula I, as follows:

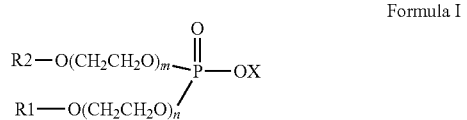

Formula I where R1 and R2 are independently H, C3-C24 saturated branched or straight-chained hydrocarbon, or C3-C24 unsaturated branched or straight-chained hydrocarbon with from 1 to 3 carbon to carbon double bonds; X is H or an alkali metal; n and m are independently from 0 to 50, where m+n can be from 1 to 100. In other examples, m+n can be from 2 to 100, from 5 to 75, or from 10 to 100, for example. In another example, one of m or n is 0, and the other of m and n is from 1 to 50, from 5 to 50, or from 10 to 50. In another example, m and n are both independently from 1 to 50, from 5 to 50, or from 10 to 50, for example.

Though the phosphate ester surfactant can contribute to good kogation performance and other printability performance enhancements, when used in combination with an NH-type or N-alkylated lactam co-solvent 118, kogation and other printability performance issues related to nozzle health, drop ejection weight, drop velocity, etc., can be further enhanced. In further detail, the NH-type lactam or N-alkylated lactam co-solvent can act to stabilize the azetidinium-containing polyamine, including the azetidinium groups thereon. This stability enhancement can help reduce resin deposit on firing resistors and further improve kogation performance. A few example NH-type or N-alkylated lactam co-solvents that can be used in the fixer fluid formulations include γ-Lactam co-solvents, or δ-lactam co-solvents, and/or ε-Lactam co-solvents. In some instances, β-Lactam co-solvents can be used. Formula II below illustrates various NH-type and N-alkylated lactam co-solvents that can be selected for use in accordance with the present disclosure, as follows:

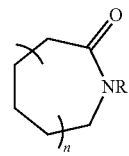

Formula II where R is H or C1 to C4 alkyl, and n is from 0 to 3, or from 1 to 3. When R is H, the lactam is an NH-type lactam co-solvent. Thus, the term "NH-type" refers to lactam co-solvents where a hydrogen is attached to the nitrogen heteroatom of the lactam ring structure. When R is C1 to C4 alkyl (straight chained or branched C3 or C4), the lactam is an N-alkylated lactam co-solvent. Thus, the term "N-alkylated" refers to lactam co-solvents where a C1 to C4 alkyl group is attached to the nitrogen heteroatom of the lactam ring structure. In further detail, when n is 0, the lactam is a β-Lactam co-solvent, when n is 1 the lactam is a γ-Lactam co-solvent, when n is 2 the lactam is a δ-lactam co-solvent, and when n is 3 the lactam is ε-Lactam co-solvent. Example NH-type lactam co-solvents that can be used include 2-pyrrolidone, 2-piperidinone and caprolactam. Example N-alkylated lactam co-solvents that can be used include N-methyl-2-pyrrolidone, 1-ethyl-2-pyrrolidone, 1-propyl-2-pyrrolidone (branched or straight chained), or 1-butyl-2-pyrrolidone (branched or straight chained).

With specific reference to the azetidinium-containing polyamine 114 that is present in the fixer fluid 110, FIG. 1 presents a representative simplified schematic formula for illustrative purposes, and should not be considered limiting. The azetidinium-containing polyamine selected for use can include any of a number of cationic polyamines with a plurality of azetidinium groups. In an uncrosslinked state, as shown in Formula III below, an azetidinium group generally has a structure as follows:

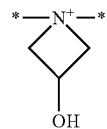

Formula III

As shown in Formula III, this structure is not intended to show repeating units, but rather merely a polymer that includes the azetidinium groups shown in Formula III, including azetidinium-containing polyamines having a weight average molecular weight from 1,000 Mw to 2,000,000 Mw, from 2,000 Mw to 1,000,000 Mw, from 5,000 Mw to 200,000 Mw, from 5,000 Mw to 100,000 Mw, or from 20,000 to 1,000,000 Mw, for example. The asterisks (*) in Formula III represent portions of the various organic groups, polymeric portions, functional moieties, etc., for example.

In some examples, the azetidinium-containing polyamine can be derived from the reaction of a polyalkylene polyamine (e.g. ethylenediamine, bishexamethylenetriamine, and hexamethylenediamine, for example) with an epihalohydrin (e.g. epichlorohydrin, for example) (referred to as PAmE resins). In some specific examples, the azetidinium-containing polyamine can include the structure of Formula IV, as follows:

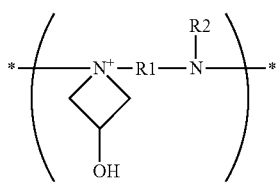

Formula IV where R1 can be a substituted or unsubstituted $C_2$-$C_{12}$ alkyl group (such as a linear alkyl group) and R2 can be H or $CH_3$. When R2 is H, the backbone nitrogen is a secondary amine. When R2 is $CH_3$, the backbone nitrogen is a tertiary amine. In some additional examples, R1 can be a $C_2$-$C_{10}$, $C_2$-$C_8$, or $C_2$-$C_6$ linear alkyl group. For example, there can be from 2 to 12 carbon atoms between amine groups (including azetidinium quaternary amine and other amines along the backbone). In other examples, there can be from 3 to 12, from 2 to 10, from 3 to 10, from 2 to 8, from 3 to 8, from 2 to 6, or from 3 to 6 carbon atoms between amine groups in the azetidinium-containing polyamine. In some examples, where R1 is a $C_3$-$C_{12}$ (or $C_3$-$C_{10}$, $C_3$-$C_8$, $C_3$-$C_6$, etc.) linear alkyl group, a carbon atom along the alkyl chain can be a carbonyl carbon, with the proviso that the carbonyl carbon does not form part of an amide group (i.e. R1 does not include or form part of an amide group). In some additional examples, a carbon atom of R1 can include a pendent hydroxyl group. The number of units as shown in Formula IV can be any number of units that results in an azetidinium-containing polyamine having a weight average molecular weight from 1,000 Mw to 2,000,000 Mw, from 2,000 Mw to 1,000,000 Mw, from 5,000 Mw to 200,000 Mw, from 5,000 Mw to 100,000 Mw, or from 20,000 to 1,000,000 Mw, for example. These units can be repeating along the polymer, along portions of the polymer, and/or can have other moieties between individual units shown in Formula IV. Thus, the asterisks (*) in Formula IV represent portions of polymer that are not shown, but could include various organic groups, polymeric portions, functional moieties, etc., for example.

As can be seen in Formula IV, the azetidinium-containing polyamine can include a quaternary amine (e.g. azetidinium group) and a non-quaternary amine (e.g., a primary amine, a secondary amine, a tertiary amine, or a combination thereof). In some specific examples, the azetidinium-containing polyamine can include a quaternary amine and a tertiary amine. In some additional examples, the azetidinium-containing polyamine can include a quaternary amine and a secondary or tertiary amine. In some further examples, the azetidinium-containing polyamine can include a quaternary amine and a primary amine. It is noted that, in some examples, some of the azetidinium groups of the azetidinium-containing polyamine can be crosslinked to a second functional group along the azetidinium-containing polyamine. Whether or not this is the case, the azetidinium-containing polyamine can have a ratio of crosslinked or uncrosslinked azetidinium groups to other amine groups of from 0.1:1 to 10:1, from 0.1:1 to 5:1, or from 1:1 to 10:1. In other examples, the azetidinium-containing polyamine can have a ratio of crosslinked or uncrosslinked azetidinium groups to other amine groups of from 0.5:1 to 2:1. Non-limiting examples of commercially available azetidinium-containing polyamines that fall within these ranges of azetidinium groups to amine groups include Crepetrol™ 73, Kymene™ 736, Polycup™ 1884, Polycup™ 7360, and Polycup™ 7360A, which are available from Solenis LLC (Delaware, USA). Other compounds from this or other companies can likewise be used.

With more specific detail regarding the Polycup™ family of azetidinium-containing polyamines, these resins tend to be formaldehyde-free, water-based crosslinking resins that are reactive with amine groups, carboxyl groups, hydroxyl groups, and thiol groups. Many of these types of groups can be present at the surface of fabric substrates, so in addition to crosslinking that may occur with the polyurethanes that are present in the ink compositions, there can be additional crosslinking at the surface of the print media substrate, particularly with respect to many different types of synthetic and/or natural fabrics. The azetidinium-containing polyamines, such as these Polycup™ brand resins, can promote water resistance to the printed images on the fabric. As one specific example, Polycup™ 7360 is a thermosetting polyamine epichlorohydrin that can include the polymer in a fluid carrier at about 38 wt % solids, and can have a range of viscosities from about 180 cP to about 300 cP at 25° C., for example. The pH of the dispersion as provided can be from about pH 2.5 to about pH 4. Curing can be modulated by modification of concentration, time, temperature, pH, etc. For example, by bringing the pH of a polyamine epichlorohydrin up to about pH 7 or to about pH 9 (by fixer fluid formulation, by mixing with ink on the fabric substrate, by the pH of the fabric substrate, etc.), curing at temperatures from about 80° C. to about 150° C. can be effective. With this and other examples, curing can be carried out using convection heating, air-draft ovens, radiant heat, infrared heating, etc. Furthermore, with these types of materials, natural crosslinking can continue to occur, if crosslinking groups are still available, at ambient temperatures over a period of weeks, e.g., one day to 6 weeks, with some polymers.

Thus, when the fixer fluid is printed on the print media substrate, such as a fabric substrate (not shown in FIG. 1, but shown in FIG. 2), suitable reactive groups that may be present at a surface of the polyurethane binder in the ink composition, and in some instances, hydroxyl groups (e.g. for cotton), amine groups (e.g. for nylon), thiol groups (e.g. for wool), or other suitable reactive groups that may be present at the surface of the print media substrate, can interact with the azetidinium groups in the fixer fluid to generate a high quality image that exhibits durable washfastness as demonstrated in the examples hereinafter. The cationic polymer including an azetidinium-containing polyamine can be present in the fixer fluid at from 0.5 wt % to 12 wt %, from 1 wt % to 7 wt %, from 2 wt % to 6 wt %, from 3 wt % to 5 wt %, or from 3 wt % to 6 wt %, for example.

Non-limiting but illustrative example reactions between the azetidinium group and various reactive groups are illustrated below in Formulas V-VIII, as follows:

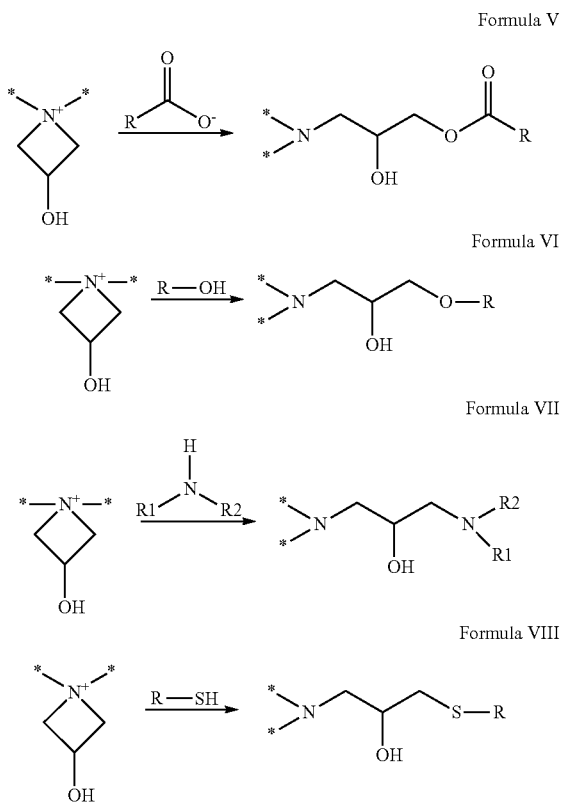

As with Formulas III and IV, in Formulas V-VIII, the asterisks (*) represent portions of the various organic compounds or polymer that may not be directly part of the reaction shown in Formulas III-VIII, and are thus not shown, but could be any of a number of organic groups, polymeric portions, functional moieties, etc., for example. Likewise, R1 and R2 can be H or any of a number of organic groups, such as those described previously in connection with R1 or R2 in Formula IV, without limitation.

In further detail, in accordance with examples of the present disclosure, the azetidinium groups present in the fixer fluid can interact with the polyurethane binder, the print media substrate, or both to form a covalent linkage therewith, as shown in Formulas V-VIII above. Other types of reactions can also occur, but Formulas V-VIII are provided by way of example to illustrate examples of reactions that can occur when the ink composition, the print media substrate, or both come into contact with the fixer fluid, e.g., interaction or reaction with the substrate, interaction or reaction between different types of polyurethane polymer, interaction or reaction between different types of azetidinium-containing polyamines, interactions or reactions with different molar ratios (other than 1:1, for example) than that shown in Formulas V-VIII, etc.

Fluid Sets for Textile Printing

Returning to FIG. 1, a fluid set 100 is shown that includes the fixer fluid 110 described above, which includes an azetidinium-containing polyamine 114 dispersed in a fixer vehicle 112. The fixer vehicle includes water, a phosphate ester surfactant 116, and an NH-type or N-alkylated lactam co-solvent 118.

The fluid set 100 also includes an ink composition 120. The ink composition in this example includes an ink vehicle 122, a pigment 124, and a polymeric binder 126. The ink vehicle can include water with a water content (based on the weight of the ink composition) from 50 wt % to 90 wt %, from 60 wt % to 90 wt %, or from 70 wt % to 85 wt %, for example. The ink vehicle can also include organic co-solvent, with one or multiple organic co-solvents being present in aggregate based on the weight of the ink composition at from 4 wt % to 30 wt %, from 6 wt % to 20 wt %, or from 8 wt % to 15 wt %, for example. Other ink vehicle components can also be included, such as surfactant, antibacterial agent, etc. However, as part of the ink composition, the pigment (dispersed with by dispersant surface-associated dispersant) and the polymeric binder polymer can be included or carried by the ink vehicle.

In further detail regarding the ink vehicle 102, co-solvent (s) can be present and can include any co-solvent or combination of co-solvents that are compatible with the pigment and polymeric binder. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1,3-propane diol (EPHD), glycerol, dimethyl sulfoxide, sulfolane, glycol ethers, alkyldiols such as 1,2-hexanediol, and/or ethoxylated glycerols such as LEG-1, etc.

The ink vehicle 102 can also include surfactant. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, or a combination thereof. In some examples, the surfactant can include a nonionic surfactant, such as a Surfynol® surfactant, e.g., Surfynol® 440 (from Evonik, Germany), or a Tergitol™ surfactant, e.g., Tergitol™ TMN-6 (from Dow Chemical, USA). In another example, the surfactant can include an anionic surfactant, such as a phosphate ester of a C10 to C20 alcohol, a polyethylene glycol oleyl mono phosphate, a polyethylene glycol oleyl diphosphate, an oleth-based phosphate, or a mixture thereof. Examples of phosphate ester surfactants that can be used include Crodafos™ N3A and/or Crodafos™ N10A, both from Croda International PLC, United Kingdom. The surfactant or combinations of surfactants, if present, can be included in the ink composition at from 0.01 wt % to 5 wt % and, in some examples, can be present at from 0.05 wt % to 3 wt %, or from 0.1 wt % to 1.5 wt %, of the ink compositions.

Consistent with the formulations of the present disclosure, various other additives may be included to provide desired properties of the ink composition for specific applications.

Examples of these additives are those added to inhibit the growth of harmful microorganisms. These additives may be biocides, fungicides, and other microbial agents, which are routinely used in ink formulations. Examples of suitable microbial agents include, but are not limited to, Acticide®, e.g., Acticide® B20 (Thor Specialties Inc.), Nuosept™ (Nudex, Inc.), Ucarcide™ (Union carbide Corp.), Vancide® (R.T. Vanderbilt Co.), Proxel™ (ICI America), or a combination thereof. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the ink as desired.

The pigment 124 that is dispersed in the ink vehicle 122 can be any of a number of pigment colorants of any of a number of primary or secondary colors, or can be black or gray, for example. More specifically, if a color pigment is used, the pigment colorant may include cyan, magenta, yellow, red, blue, violet, orange, green, etc. In one example, the ink composition 120 can be a black ink with a carbon black pigment. In another example, the ink composition can be a cyan or green ink with a copper phthalocyanine pigment, e.g., Pigment Blue 15:0, Pigment Blue 15:1, Pigment Blue 15:3, Pigment Blue 15:4, Pigment Green 7, Pigment Green 36, etc. In another example, the ink composition can be a magenta ink with a quinacridone pigment or a co-crystal of quinacridone pigments. Example quinacridone pigments that can be utilized can include PR122, PR192, PR202, PR206, PR207, PR209, PO48, PO49, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., Pigment Yellow 74 and Pigment Yellow 155. In one example, the pigment can include aromatic moieties.

With respect to dispersing the pigment 124 in the ink composition, the pigment can be dispersed by a dispersing agent or dispersing polymer. In some examples, the pigment can be dispersed by a polymer dispersant, such as a styrene (meth)acrylate dispersant, or another dispersant suitable for keeping the pigment suspended in the ink vehicle 102. For example, the dispersant can be any dispersing (meth)acrylate polymer, or other type of polymer, such as a styrene maleic acid copolymer. In one specific example, the (meth) acrylate polymer can be a styrene-acrylic type dispersant polymer, as it can promote π-stacking between the aromatic ring of the dispersant and various types of pigments, such as copper phthalocyanine pigments, for example. Examples of commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). This can be the case for either dispersant polymer for pigment dispersion or for dispersed polymer binder that may include co-polymerized acrylate and/or methacrylate monomers. Also, in some examples, the terms "(meth) acrylate" and "(meth)acrylic acid" can be used interchangeably, as acrylates and methacrylates described herein include salts of acrylic acid and methacrylic acid, respectively. Thus, mention of one compound over another can be a function of pH. Furthermore, even if the monomer used to form the polymer was in the form of a (meth)acrylic acid during preparation, pH modifications during preparation or subsequently when added to an ink composition can impact the nature of the moiety as well (acid form vs. salt form). Thus, a monomer or a moiety of a polymer described as (meth) acrylic acid or as (meth)acrylate should not be read so rigidly as to not consider relative pH levels, and other general organic chemistry concepts. In still further detail, this definition as to terms (meth)acrylic, (meth)acrylate, or the like can be applicable to other types of polymer that may be present in the ink compositions described herein, such as in the case of (meth)acrylic latex particles used, in some examples, as the polymeric binder in the ink composition.

Turning now to the polymeric binder 126, example polymeric binders that can be used can be in the form of (meth)acrylic latex particles, polyurethane particles, or a combination thereof, for example. In FIG. 1, the relative sizes of the pigment and the polymeric binder are not drawn to scale. Regardless of the type of polymeric binder present, the polymeric binder particles can be present in the ink composition in an amount from 2 wt % to 15 wt %, from 4 wt % to 12 wt %, from 6 wt % to 11 wt %, from 8 wt % to 12 wt %, or from 5 wt % to 9 wt %, for example. The polymeric binder particles can have a D50 particle size from 25 nm to 900 nm, from 50 nm to 750 nm, from 100 nm to 500 nm, or from 150 nm to 400 nm, for example.

The polymeric binder or binder particles can have a weight average molecular weight, for example, from 2,000 Mw to 500,000 Mw, from 4,000 Mw to 250,000 Mw, from 5,000 Mw to 200,000 Mw, for example. The polymeric binder particles can have an acid number from 0 to 180, from 1 to 100, from 1 to 20, or from 2 to 15, for example.

Regarding the (meth)acrylic latex particles that may be used as the polymeric binder, any variety of (meth)acrylic latexes can be used. For example, any of a number of dispersed polymer prepared from acrylate and/or methacrylate monomers, including an aromatic (meth)acrylate monomer that results in aromatic (meth)acrylate moieties as part of the acrylic latex can be used. In some examples, the (meth)acrylic latex particles can include a single heteropolymer that is homogenously copolymerized. In another example, a multi-phase (meth)acrylic latex polymer can be prepared to form the (meth)acrylic latex particles, and the polymer can include a first heteropolymer and a second heteropolymer. The two heteropolymers can be physically separated in the (meth)acrylic latex particles, such as in a core-shell configuration, a two-hemisphere configuration, smaller spheres of one phase distributed in a larger sphere of the other phase, interlocking strands of the two phases, and so on. If a two-phase polymer, the first heteropolymer phase can be polymerized from two or more aliphatic (meth) acrylate ester monomers or two or more aliphatic (meth) acrylamide monomers. The second heteropolymer phase can be polymerized from a cycloaliphatic monomer, such as a cycloaliphatic (meth)acrylate monomer or a cycloaliphatic (meth)acrylamide monomer. The first or second heteropolymer phase can include the aromatic (meth)acrylate monomer, e.g., phenyl, benzyl, naphthyl, etc. In one example, the aromatic (meth)acrylate monomer can be a phenoxylalkyl (meth)acrylate that forms a phenoxylalkyl (meth)acrylate moiety within the (meth)acrylic latex particles, e.g. phenoxylether, phenoxylpropyl, etc. The second heteropolymer phase can have a higher $T_g$ than the first heteropolymer phase in one example. The first heteropolymer composition may be considered a soft polymer composition and the second heteropolymer composition may be considered a hard polymer composition. If a two-phase heteropolymer, the first heteropolymer composition can be present in the (meth)acrylic latex particle in an amount ranging from 15 wt % to 70 wt % of a total weight of the (meth)acrylic latex particle, and the second heteropolymer composition can be present in an amount ranging from 30 wt % to 85 wt % of the total weight of the polymer particle.

In more general terms, whether there is a single heteropolymer phase, or there are multiple heteropolymer phases, heteropolymer(s) or copolymer(s) can include a number of various types of copolymerized monomers, including aliphatic(meth)acrylate ester monomers, such as linear or branched aliphatic (meth)acrylate monomers, cycloaliphatic (meth)acrylate ester monomers, or aromatic monomers. However, in accordance with the present disclosure, the aromatic monomer(s) selected for use can include an aromatic (meth)acrylate monomer.

Examples of aromatic (meth)acrylate monomers that can be used in a heteropolymer or copolymer of the (meth) acrylic latex (single-phase, dual-phase in one phase or both phases, etc.) include 2-phenoxylethyl methacrylate, 2-phenoxylethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxy-propyl acrylate, 2-hydroxy-3-phenoxypropyl methacrylate, naphthyl methacrylate, naphthyl acrylate, phenyl methacrylate, phenyl acrylate, or a combination thereof. In one example, the (meth)acrylic latex particles can include a phenoxylethyl acrylate and a phenoxylethyl methacrylate, or a combination of a phenoxylethyl acrylate and phenoxylethyl methacrylate.

Examples of the linear aliphatic (meth)acrylate monomers that can be used include ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, or a combination thereof.

Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, or a combination thereof.

In other examples, the (meth)acrylic latex particles can include polymerized copolymers, such as emulsion polymers of one or multiple monomers, and can also be prepared using a reactive surfactant in some examples. Example reactive surfactants can include polyoxyethylene alkylphenyl ether ammonium sulfate surfactant, alkylphenol ethoxylate free polymerizable anionic surfactant, sodium polyoxyethylene alkylether sulfuric ester based polymerizable surfactant, or a combination thereof. Commercially available examples include Hitenol® AR series, Hitenol® KH series (e.g. KH-05 or KH-10), or Hitenol® BC series, e.g., Hitenol® BC-10, BC-30, (all available from Montello, Inc., Oklahoma), or combinations thereof. Example monomers that can be used include styrene, alkyl methacrylate (for example C1 to C8 alkyl methacrylate), alkyl methacrylamide (for example C1 to C8 alkyl methacrylamide), butyl acrylate, methacrylic acid, or combinations thereof. In some examples, the (meth)acrylic latex particles can be prepared by combining the monomers as an aqueous emulsion with an initiator. The initiator may be selected from a persulfate, such as a metal persulfate or an ammonium persulfate. In some examples, the initiator may be selected from a sodium persulfate, ammonium persulfate or potassium persulfate.

If the polymeric binder selected for use in the ink composition is a polyurethane binder, any of a number of polyurethane binders can be selected. In one example, the polyurethane binder is a polyester-polyurethane binder. In some further examples, the polyurethane binder can be a sulfonated polyester-polyurethane. In one example, the sulfonated polyester-polyurethane binder can be anionic. In further detail, the sulfonated polyester-polyurethane binder can also be aliphatic including saturated carbon chains therein as part of the polymer backbone or side-chain thereof, e.g., C2 to C10, C3 to C8, or C3 to C6 alkyl. These polyester-polyurethane binders can be described as "alkyl" or "aliphatic" because these carbon chains are saturated and because they are devoid of aromatic moieties. An example anionic aliphatic polyester-polyurethane binder that can be used is Impranil® DLN-SD (Mw 133,000 Mw; Acid Number 5.2; Tg—47° C.; Melting Point 175-200° C.) from Covestro (Germany). Example components used to prepare the Impranil® DLN-SD or other similar anionic aliphatic polyester-polyurethane binders can include pentyl glycols, e.g., neopentyl glycol; C4-C10 alkyldiol, e.g., hexane-1,6-diol; C4 to C10 alkyl dicarboxylic acids, e.g., adipic acid; C4 to C10 alkyl diisocyanates, e.g., hexamethylene diisocyanate (HDI); diamine sulfonic acids, e.g., 2-[(2-aminoethyl)amino]-ethanesulfonic acid; etc. Alternatively, the polyester-polyurethane binder can be aromatic (or include an aromatic moiety) along with aliphatic chains. An example of an aromatic polyester-polyurethane binder that can be used is Dispercoll® U42 (CAS #83111-01-7). Example components used to prepare the Dispercoll® U42 or other similar aromatic polyester-polyurethane binders can include aromatic dicarboxylic acids, e.g., phthalic acid; C4 to C10 alkyl dialcohols, e.g., hexane-1,6-diol; C4 to C10 alkyl diisocyanates, e.g., hexamethylene diisocyanate (HDI); diamine sulfonic acids, e.g., 2-[(2-aminoethyl)amino]-ethanesulfonic acid; etc. Other types of polyester-polyurethanes can also be used, including Impranil® DL 1380, which can be somewhat more difficult to jet from thermal inkjet printheads compared to Impranil® DLN-SD and Dispercoll® U42, but still can be acceptably jetted in some examples. Other types of polyurethanes (other than the polyester-type polyurethanes) can likewise be used, such as aromatic polyether polyurethanes, aliphatic polyether polyurethanes, aromatic polycaprolactam polyurethanes, aliphatic polycaprolactam polyurethanes, vinyl-urethane hybrid polymers, acrylic-urethane hybrid polymers, including acid-modified polyurethanes thereof, e.g., sulfonated, carboxylated, etc.

Systems and Methods of Textile Printing

Figure 2:
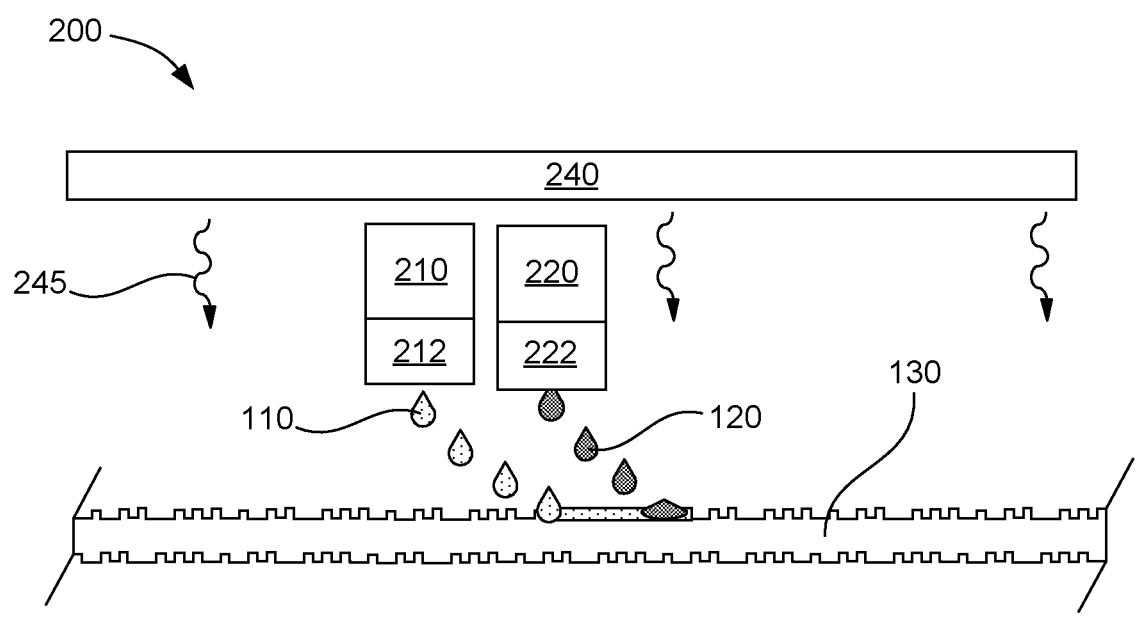
FIG. 2 schematically depicts an example textile printing system and method that includes an ink composition, a fixer fluid, a print media substrate, fluidjet pens, and a heating device in accordance with the present disclosure.

As shown in FIG. 2, a textile printing method is shown in the context of a textile printing system 200. The system can include an ink composition 120 and a fixer fluid 110 for printing on a textile substrate 130. In some examples, the textile printing system can further include various architectures related to ejecting fluids and treating fluids after ejecting onto the print media substrate. For example, the ink composition can be printed from an inkjet pen 220 which includes an ejector 222, such as a thermal inkjet ejector or some other digital ejector technology. Likewise, the fixer fluid can be printed from a fluidjet pen 210 which includes an ejector 212, such as a thermal ejector or some other digital ejector technology. The inkjet pen and the fluidjet pen can be the same type of ejector or can be two different types of ejectors. Both may be thermal inkjet ejectors, for example. Also shown, as can be included in one example, is a heating device 240 to apply heat 245 to the print media substrate to cure the ink composition, e.g., causing the crosslinking reaction to occur or accelerate.

Though a fabric print medium is shown in FIG. 2, the ink compositions 120 and fixer fluids 110 may be suitable for printing on many types of print media substrates, such as papers, films, etc. If printing on fabric, for example, example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the fabric substrates can include polymeric fibers such as, nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, a copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

The fabric substrate can be in one of many different forms, including, for example, a textile, a cloth, a fabric material, fabric clothing, or other fabric product suitable for applying ink, and the fabric substrate can have any of a number of fabric structures. The term "fabric structure" is intended to include structures that can have warp and weft, and/or can be woven, non-woven, knitted, tufted, crocheted, knotted, and pressured, for example. The terms "warp" and "weft" have their ordinary meaning in the textile arts, as used herein, e.g., warp refers to lengthwise or longitudinal yarns on a loom, while weft refers to crosswise or transverse yarns on a loom.

It is notable that the term "fabric substrate" or "fabric media substrate" does not include materials considered to be paper (even though paper can include multiple types of natural and synthetic fibers or mixtures of both types of fibers). Fabric substrates can include textiles in filament form, textiles in the form of fabric material, or textiles in the form of fabric that has been crafted into a finished article (e.g. clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of 90°. This woven fabric can include but is not limited to, fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are bonded together and interlocked together by a chemical treatment process (e.g., a solvent treatment), a mechanical treatment process (e.g., embossing), a thermal treatment process, or a combination of multiple processes.

As previously mentioned, the fabric substrate can be a combination of fiber types, e.g. a combination of any natural fiber with another natural fiber, any natural fiber with a synthetic fiber, a synthetic fiber with another synthetic fiber, or mixtures of multiple types of natural fibers and/or synthetic fibers in any of the above combinations. In some examples, the fabric substrate can include natural fiber and synthetic fiber. The amount of the various types of fiber can vary. For example, the amount of the natural fiber can vary from 5 wt % to 95 wt % and the amount of synthetic fiber can range from 5 wt % to 95 wt %. In yet another example, the amount of the natural fiber can vary from 10 wt % to 80 wt % and the synthetic fiber can be present from 20 wt % to 90 wt %. In other examples, the amount of the natural fiber can be 10 wt % to 90 wt % and the amount of synthetic fiber can also be 10 wt % to 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the fabric substrate can have a basis weight ranging from 10 gsm to 500 gsm. In another example, the fabric substrate can have a basis weight ranging from 50 gsm to 400 gsm. In other examples, the fabric substrate can have a basis weight ranging from 100 gsm to 300 gsm, from 75 gsm to 250 gsm, from 125 gsm to 300 gsm, or from 150 gsm to 350 gsm.

In addition, the fabric substrate can contain additives including, but not limited to, colorant (e.g., pigments, dyes, and tints), antistatic agents, brightening agents, nucleating agents, antioxidants, UV stabilizers, fillers and lubricants, for example. Alternatively, the fabric substrate may be pre-treated in a solution containing the substances listed above before applying other treatments or coating layers.

Regardless of the substrate, whether paper, natural fabric, synthetic fabric, fabric blend, treated, untreated, etc., the print media substrates printed with the fluid sets of the present disclosure can provide acceptable optical density (OD) and/or washfastness properties. The term "washfastness" can be defined as the OD that is retained or delta E ($\Delta$E) after five (5) standard washing machine cycles using warm water and a standard clothing detergent (e.g., Tide® available from Proctor and Gamble, Cincinnati, OH, USA). Essentially, by measuring OD and/or L*a*b* both before and after washing, %$\Delta$OD and $\Delta$E value can be determined, which is essentially a quantitative way of expressing the difference between the OD and/or L*a*b* prior to and after undergoing the washing cycles. Thus, the lower the %$\Delta$OD and $\Delta$E values, the better. In further detail, $\Delta$E is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the ΔE value calculated based on subtracting the pre-washing color values of L*, a*, and b* from the post-washing color values of L*, a*, and b*. Those values can then be squared, and then a square root of the sum can be determined to arrive at the ΔE value. The 1976 standard can be referred to herein as "$\Delta E_{CIE}$." The CIE definition was modified in 1994 to address some perceptual non-uniformities, retaining the L*a*b* color space, but modifying to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the unwanted blue region at hue angles of 275°), ii) compensation for neutral colors or the primed values in the L*C*h differences, iii) compensation for lightness ($S_L$), iv) compensation for chroma ($S_C$), and v) compensation for hue ($S_H$). The 2000 modification can be referred to herein as "$\Delta E_{2000}$." In accordance with examples of the present disclosure, ΔE value can be determined using the CIE definition established in 1976, 1994, and 2000 to demonstrate washfastness. However, in the examples of the present disclosure, $\Delta E_{CIE}$ and $\Delta E_{2000}$ are used. Further, in 1984, a difference measurement, based on an L*C*h model was defined and called CMC l:c. This metric has two parameters: lightness (l) and chroma (c), allowing users to weigh the difference based on the ratio of l:c that is deemed appropriate for the application. Commonly used values include 2:1 for acceptability and 1:1 for threshold of imperceptibility. This difference metric is also reported in various examples of the present disclosure.

In further detail, the textile printing methods, as shown in the system at 200, can include a fixer fluid 110, which can use an azetidinium-containing polyamine in a liquid vehicle including the phosphate ester surfactant and the NH-type or N-alkylated lactam co-solvent, as previously mentioned. The fixer fluid can be printed from a fluidjet pen 230 which includes an ejector 232, such as a fluid ejector which can also be a thermal inkjet ejector. As mentioned, in one example, the azetidinium groups of the fixer fluid can interact with the polyurethane binder (of the ink composition 100), the textile substrate 130, or both to form a covalent linkage therewith. In some examples, a heating device 240 can be used to apply heat to the print media substrate to cure the ink composition, e.g., causing the crosslinking reaction to occur or accelerate. Heat can be applied using forced hot air, a heating lamp, an oven, or the like. Curing the ink composition contacted with the fixer fluid on the print media substrate can occur at a temperature from 80° C. to 200° C. for from 5 seconds to 10 minutes, or from 120° C. to 180° C. for from 30 seconds to 5 minutes.

Figure 3:
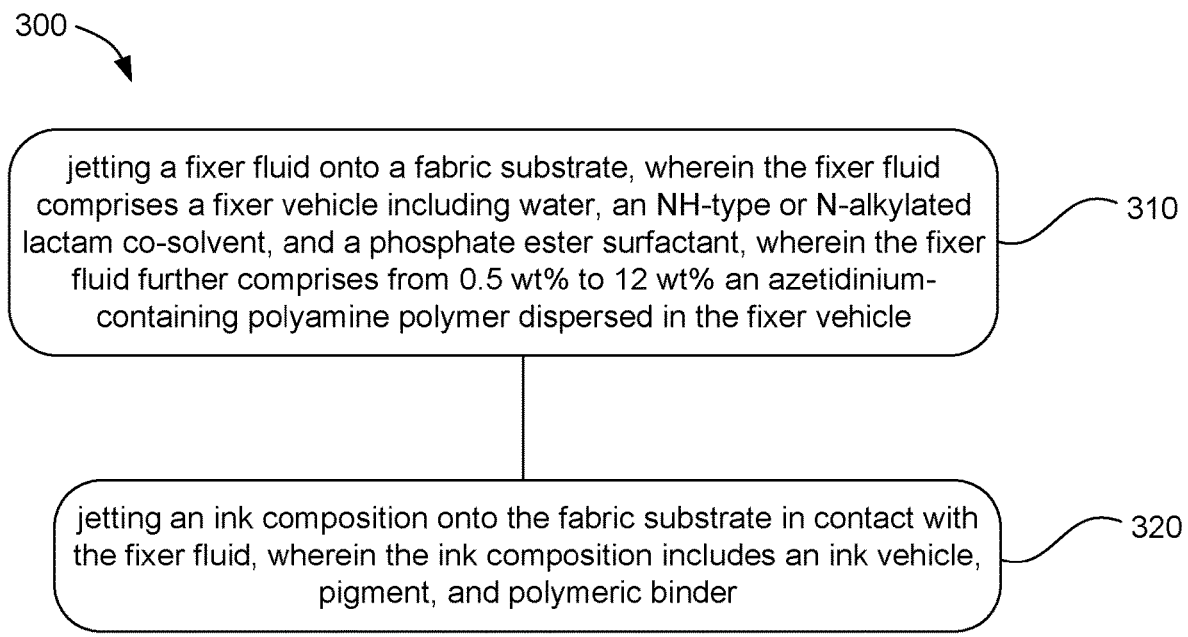
FIG. 3 depicts an example method of printing on textiles in accordance with the present disclosure.

In another example, and as set forth in FIG. 3, a method 300 of printing can include jetting 310 a fixer fluid onto a fabric substrate, wherein the fixer fluid includes a fixer vehicle including water, an NH-type or N-alkylated lactam co-solvent, and a phosphate ester surfactant, wherein the fixer fluid further includes from 0.5 wt % to 12 wt % an azetidinium-containing polyamine polymer dispersed in the fixer vehicle. The method can further include jetting 320 an ink composition onto the fabric substrate in contact with the fixer fluid, wherein the ink composition includes an ink vehicle, pigment, and polymeric binder.

In some specific examples, jetting the fixer fluid onto the print media substrate and jetting the ink composition onto the print media substrate can be performed simultaneously. In other examples, jetting the fixer fluid onto the print media substrate can be performed prior to jetting the ink composition onto the print media substrate. For example, the fixer fluid can be applied to any digital jetting method (e.g. piezo, thermal, mechanical jetting, etc.) and to the print media substrate followed by jetting the ink composition onto the print media substrate. In some examples, the cationic polymer (which includes both types of cationic polymer) and the polyurethane binder can be jetted onto the print media substrate at a weight ratio of from 0.05:1 to 2:1, or from 0.2:1 to 1:1. In other examples, the azetidinium-containing polyamine and the polymeric binder can be jetted onto the print media substrate at a weight ratio from 0.2:1 to 1:1.

For purposes of good jettability, the fixer fluid can typically have a surface tension of from 21 dyne/cm to 55 dyne/cm at 25° C., which is particularly useful for thermal ejector technology, though surface tensions outside of this range can be used for some types of ejector technology, e.g., piezoelectric ejector technology. Surface tension can be measured by the Wilhelmy plate method with a Kruss tensiometer. The viscosity can be from 1.5 cP to 15 cP, from 1.5 cP to 12 cP, or from 1.5 cP to 8 cP at 25° C. which can be measured at a shear rate of 3,000 Hz, e.g., with a Hydramotion Viscolite viscometer.

It is also noted that the method of printing can also include heating the fixer fluid and the ink composition to a temperature from 80° C. to 200° C. for a period of from 5 seconds to 10 minutes, or from 120° C. to 180° C. for a period of 30 seconds to 5 minutes, or other suitable temperature and time-frame as disclosed herein. Suitable heating devices can include heating lamps, curing ovens, forced air drying devices, or the like that apply heated air to the media substrate.

It is noted that, as used in this specification and the appended claims, the singular forms "a," "an," and "the" include plural referents unless the content clearly dictates otherwise.

"D50" particle size is defined as the particle size at which about half of the particles are larger than the D50 particle size and about half of the other particles are smaller than the D50 particle size (by weight based on the particle content of the specific material providing particle size information). As used herein, particle size with respect to the various polymer binders, or any other particles, can be based on volume of the particle size normalized to a spherical shape for diameter measurement, for example. Particle size can be collected using a Malvern Zetasizer, for example. Particle size information can also be determined and/or verified using a scanning electron microscope (SEM).

The term "acid value" or "acid number" refers to the mass of potassium hydroxide (KOH) in milligrams that can be used to neutralize one gram of substance (mg KOH/g), such as the polyurethane or latex polymers disclosed herein. This value can be determined, in one example, by dissolving or dispersing a pre-defined or known quantity of a material in organic solvent and then titrating with a solution of potassium hydroxide (KOH) of known concentration for measurement.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology to determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are illustrative of the application of the principles of the presented fabric print media and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be the acceptable examples.

Example 1—Preparation of Fixer Fluids

Ten (10) experimental fixer fluids were prepared that included an NH-type or N-alkylated lactam co-solvent, a phosphate ester, and an azetidinium-containing polyamine, as set forth in Tables 1A and 1B, labeled Exp-Fixer 1-10. Additionally, seven (7) comparative fixer fluids were prepared as set forth in Table 1C, labeled Comp-Fixer 1-7. The fixer fluids were prepared in accordance with the present disclosure are shown by example in Tables 1A and 1B, and comparative fixer fluids are shown in Table 1C.

In Tables 1A-1C, weight percentages are based on solids content of active ingredient, e.g., polyamine, phosphate ester surfactant, etc. "MDPN" is an acronym for Million Dots per Nozzle. "DW 0 MDPN" refers to the initial drop weight. "%Δ DW 200 MDPN" is based on the equation: %Δ DW 200 MDPN=(DW 200 MDPN−DW 0 MDPN)/DW 0 MDPN. "DV 0 MDPN" refers to initial drop velocity. "%Δ DV 200 MDPN" is based on the equation: %Δ DV 200 MDPN=(DV 200 MDPN−DV at 0 DMPN)/DV 0 MDPN.

TABLE 1A

| Experimental Fixer Fluids (Exp-Fixer 1-5) | | | | | | |
|---|---|---|---|---|---|---|
| Component | Category | Exp-Fixer 1 (wt %) | Exp-Fixer 2 (wt %) | Exp-Fixer 3 (wt %) | Exp-Fixer 4 (wt %) | Exp-Fixer 5 (wt %) |
| Formulations | | | | | | |
| 2-Pyrrolidone | N—H type Lactam Co-solvent | 2 | 4 | 6 | 8 | 10 |
| Polycup ™ 7360A | Azetidinium-containing polyamine | 4 | 4 | 4 | 4 | 4 |
| Crodafos ™ N3A | Phosphate Ester Surfactant | 0.5 | 0.5 | 0.5 | 0.5 | 0.5 |
| Surfynol ® 440 | Surfactant | 0.3 | 0.3 | 0.3 | 0.3 | 0.3 |
| Water | Solvent | Balance | | | | |
| Fluid Properties and Stability | | | | | | |
| pH at 25° C. | | 2.85 | 2.91 | 3.03 | 3.08 | 3.11 |
| Viscosity at 25° C. (cP) | | 2.3 | 2.5 | 2.6 | 2.8 | 2.9 |
| Accelerated Shelf Life (ASL) Viscosity (25° C.; 1 week; 60° C.) (cP) | | 2.3 | 2.4 | 2.6 | 2.7 | 2.9 |
| %Δ ASL | | 0 | −4 | 0 | −3.6 | 0 |
| Kogation and Pen Reliability Million Drops Per Nozzle (MDPN) | | | | | | |
| DW 0 MDPN | | 13 | 13 | 12.9 | 12.8 | 12.6 |
| %Δ DW 200 MDPN | | 2 | −7.9 | −2.8 | −0.9 | 1.3 |
| DV 0 MDPN | | 13 | 12.9 | 13 | 12.5 | 12.1 |
| %Δ DV 200 MDPN | | −7 | 0.3 | −10 | −8.8 | −5.9 |
| % Nozzles Firing 200 MDPN | | 100 | 89.6 | 97.9 | 97.9 | 100 |

MDPN = Million Drops Per Nozzle;
DW = Drop Weight;
DV = Drop Velocity
Polycup ™ 7360A is available from Solenis LLC (USA) and includes linear alkyl chains from 2 to 12 carbon atoms between the azetidiniuim group and amine groups along the backbone of the polymer.
Crodafos ™ is available from Croda Inc. (USA).
Surfynol ® is available from Evonik, (Germany).
pH was measured using a pH meter from Fisher Scientific (Accumet XL250).
Viscosity was measured at a shear rate of 3,000 Hz with a Hydramotion Viscolite Viscometer.

TABLE 1B

Experimental Fixer Fluids (Exp-Fixer 6-10)

| Component | Category | Exp-Fixer 6 (wt %) | Exp-Fixer 7 (wt %) | Exp-Fixer 8 (wt %) | Exp-Fixer 9 (wt %) | Exp-Fixer 10 (wt %) |
|---|---|---|---|---|---|---|
| Formulations | | | | | | |
| N-Methyl-2-Pyrrolidone | N-alkylated Lactam Co-solvent | 4 | 4 | — | — | — |
| N-Ethyl-2-Pyrrolidone | N-alkylated Lactam Co-solvent | — | — | 4 | — | — |
| Delta-Valerolactam | NH-type Lactam Co-solvent | — | — | — | 4 | 4 |
| Polycup ™ 7360A | Azetidinium-containing polyamine | 4 | 4 | 4 | 4 | 4 |
| Crodafos ™ N3A | Phosphate Ester Surfactant | 0.5 | — | 0.5 | 0.5 | — |
| Crpdafos ® N10A | Phosphate Ester Surfactant | — | 0.5 | — | — | 0.5 |
| Surfynol ® 440 | Surfactant | 0.3 | 0.3 | 0.3 | 0.3 | 0.3 |
| Water | Solvent | Balance | | | | |
| Fixer Fluid Properties and Stability | | | | | | |
| pH at 25° C. | | 2.8 | 3.02 | 2.89 | 3.53 | 3.66 |
| Viscosity at 25° C. (cP) | | 2.4 | 2.4 | 2.5 | 2.4 | 2.4 |
| Accelerated Shelf Life (ASL) Viscosity (25° C.; 1 week; 60° C.) | | 2.4 | 2.3 | 2.5 | 2.3 | 2.3 |
| %Δ ASL | | 0 | −4.2 | 0 | −4.2 | −4.2 |
| Kogation and Pen Reliability | | | | | | |
| Drop Weight (DW) 0 MDPN | | 10.6 | 11 | 12.9 | 10.4 | 11.1 |
| % DW 200 MDPN | | −2.2 | −5.5 | 0.7 | −16.8 | 1.5 |
| Drop Velocity (DW) MDPN | | 11.6 | 10.5 | 13.5 | 12.9 | 11.1 |
| % DV 200 MDPN | | −12.3 | −2.7 | −10.9 | −17.7 | −2.5 |
| % Nozzles firing 200 MDPN | | 96 | 100 | 100 | 92 | 100 |

Polycup ™ is available from Solenis LLC (USA) and includes linear alkyl chains from 2 to 12 carbon atoms between the azetidiniuim group and amine groups along the backbone of the polymer.
Crodafos ™ is available from Croda Inc. (USA).
Surfynol ® is available from Evonik, (Germany).
pH was measured using a pH meter from Fisher Scientific (Accumet XL250).
Viscosity was measured at a shear rate of 3,000 Hz with a Hydramotion Viscolite Viscometer.

TABLE 1C

Comparative Fixer Fluids (Comp-Fixer 1-7)

| Component | Category | Comp-Fixer 1 (wt %) | Comp-Fixer 2 (wt %) | Comp-Fixer 3 (wt %) | Comp-Fixer 4 (wt %) | Comp-Fixer 5 (wt %) | Comp-Fixer 6 (wt %) | Comp-Fixer 7 (wt %) |
|---|---|---|---|---|---|---|---|---|
| Formulations | | | | | | | | |
| 2-Pyrrolidone | NH-type Lactam Co-solvent | — | — | 2 | 4 | 12 | — | — |
| 2-Hydroxyethyl-2-Pyrrolidone | Hydroxyethyl Lactam Co-solvent | — | — | — | — | — | — | 4 |
| Polycup ™ 7360A | Azetidinium-containing polyamine | 4 | 4 | 4 | 4 | 4 | 4 | 4 |
| Crodafos ™ N3A | Phosphate Ester Surfactant | — | — | — | — | — | 0.5 | 0.5 |
| Surfynol ® 440 | Surfactant | — | 0.3 | 0.3 | 0.3 | 0.3 | 0.3 | 0.3 |
| Water | Solvent | Balance | | | | | | |
| Fixer Fluid Properties and Stability | | | | | | | | |
| pH at 25° C. | | 4.06 | 5.18 | 4.14 | 4.18 | 4.31 | 2.88 | 2.92 |
| Viscosity at 25° C. (cP) | | 2.4 | 2.2 | 2.5 | 2.6 | 3.2 | 2.3 | 2.5 |
| Accelerated Shelf Life (ASL) Viscosity (25° C.; 1 week; 60° C.) | | 2.2 | 2.2 | 2.4 | 2.4 | 2.6 | 2.3 | 2.4 |
| %Δ ASL | | −8.3 | 0 | −4 | −7.7 | −18.8 | 0 | −4 |

TABLE 1C-continued

Comparative Fixer Fluids (Comp-Fixer 1-7)

| Component | Category | Comp-Fixer 1 (wt %) | Comp-Fixer 2 (wt %) | Comp-Fixer 3 (wt %) | Comp-Fixer 4 (wt %) | Comp-Fixer 5 (wt %) | Comp-Fixer 6 (wt %) | Comp-Fixer 7 (wt %) |
|---|---|---|---|---|---|---|---|---|
| Kogation and Pen Reliability | | | | | | | | |
| Drop Weight (DW) 0 MDPN | | 5.2 | 2 | 6.2 | 5.2 | 6.5 | 13.1 | 13.1 |
| % DW 200 MDPN | | −100 | −100 | −100 | −100 | −100 | −57.7 | −95.9 |
| Drop Velocity (DW) 0 MDPN | | 8.2 | N/A | N/A | N/A | 5.2 | 13.7 | 13.7 |
| % DV 200 MDPN | | −100 | −100 | −100 | −100 | −100 | −5.9 | −100 |
| % Nozzles firing at 200 MDPN | | 0 | 0 | 0 | 0 | 0 | 41.7 | 0 |

Polycup ™ is available from Solenis LLC (USA) and includes linear alkyl chains from 2 to 12 carbon atoms between the azetidiniuim group and amine groups along the backbone of the polymer.
Crodafos ™ is available from Croda Inc. (USA).
Surfynol ® is available from Evonik, (Germany).
pH was measured using a pH meter from Fisher Scientific (Accumet XL250).
Viscosity was measured at a shear rate of 3,000 Hz with a Hydramotion Viscolite Viscometer.

As can be seen by comparing Experimental Fixer Fluids 1-10 with Comparative Fixer Fluids 1-7, the Experimental Fixer Fluids tended to have slightly better fluid properties and stability in many instances, but with respect to kogation and pen reliability, the Experimental Fixer Fluids outperformed the Comparative Fixer Fluids across the board. For example, a combination of an azetidinium-containing polyamine, an N-alkylated lactam, and a phosphate ester surfactant, as found in Experimental Fixer Fluids 6-10 resulted in good kogation performance up to about 200 million drops per nozzles (MDPN), e.g., all of the nozzles have been fired 200 million drops. With respect to the use of 2-pyrrolidone (which is an NH-type lactam co-solvent with a 5-membered ring), this compound also provided acceptable results with respect to kogation. However, by removing one of those three components (Comp-Fixer 1-6), or using all three-components but including an alkoxylated lactam (Comp-Fixer 7) instead of an alkylated lactam, the kogation performance was poor. Thus, the presence of the hydroxyl group reduced kogation performance.

Both types of Crodafos™, namely N3A and N10A, which are both phosphate ester surfactants, work when combined with a lactam so-solvent and more particularly when combined with an N-alkylated lactam co-solvent. The phosphate ester co-solvent alone can improve pen performance, such as reducing drop weight loss, drop velocity loss, and nozzle health. However, it does not appear to be enough to provide good kogation when the nozzles have been fired a large amount of drops, such as at 200 MDPN. A combination of the phosphate ester surfactant and the N-alkylated lactam can provide these enhanced kogation results or better pen life.

Example 2—Preparation of Ink Compositions

Two (2) ink compositions were prepared to evaluate their print durability when printed on a fabric substrate with and without the experimental fixer fluids of the present disclosure. More specifically, a black ink composition (Ink K) and a cyan ink composition (Ink C) were prepared. The ink compositions are set forth in Table 2, as follows:

TABLE 2

Black Ink Composition (Ink K) and Cyan Ink Composition (Ink C)

| Component | Category | Ink K (wt %) | Ink C (wt %) |
|---|---|---|---|
| Pigment Dispersion | Colorant | 3 | 2.5 |
| Impranil ® DLN-SD | Polyurethane Binder | 6 | 6 |
| Glycerol | Organic Co-solvent | 8 | 8 |
| Crodafos ™ N3A | Phosphate Ester Surfactant | 0.5 | 0.5 |
| LEG-1 | Organic Co-solvent | 1 | 1 |
| Surfynol ® 440 | Surfactant | 0.3 | 0.3 |
| Acticide ® B20 | Biocide | 0.22 | 0.22 |
| Water | Solvent | Balance | Balance |

Impranil is available from Covestro (Germany).
Crodafos ™ is available from Croda Inc. (USA).
Surfynol ® is available from Evonik (Germany).
Acticide ® is available from Thor Specialties, Inc. (USA).
Weight % is based on Solids Content of active ingredient, e.g., polyurethane binder, phosphate ester surfactant, active component in biocide, etc.

Example 3—Optical Density and Washfastness Durability Performance

Inks K and C from Example 2 were printed on multiple 100 wt % cotton fabric substrates (woven 100 wt % cotton and knitted 100 wt % cotton) with and without Experimental Fixer Fluids 1-5 (shown as Exp-Fixer 1-5 in Table 3A) or Experimental Fixer Fluids 1-8 (shown as Exp-Fixer 1-6 and 8 in Table 3B) from Example 1. Printed samples were washed 5 times with a standard washing machine (Whirlpool Washer, Model WTW5000DW) in warm water (about 40° C.) with detergent (Tide®). The samples were air dried between washes. The samples were measured for OD and L*a*b* before and after the 5 washes. After the five cycles, optical density (OD) and L*a*b* values were measured for comparison, and delta E (ΔE) values were calculated using the 1976 standard denoted as $\Delta E_{CIE}$ as well as the 2000 standard denoted as $\Delta E_{2000}$. $\Delta E_{CMC}$ (2:1) values are also reported. The purpose of this study was to investigate whether blending an azetidinium-containing polyamine with an NH-type or N-alkylated lactam co-solvent and the phosphate ester surfactant would provide good optical density and/or washfastness durability. All data was collected after printing the fixer (if any) at 10 grams per square meter (gsm), then printing the ink composition directly on the fixer (if present) 20 gsm, and then heat curing at 150° C. for 3 minutes. The results are provided in Table 3, as follows:

TABLE 3A

Optical Density and Washfastness Durability on 100% Cotton Substrate (Woven)

| Fixer ID (10 gsm) | Ink ID (20 gsm) | OD (0 wash) | OD (5 washes) | %ΔOD | $\Delta E_{CIE}$ | $\Delta E_{2000}$ | $\Delta E_{CMC}$ (2:1) |
|---|---|---|---|---|---|---|---|
| None | Ink K | 1.035 | 0.850 | −17.9 | 9.79 | 8.69 | 8.23 |
|  | Ink C | 1.006 | 0.824 | −18.1 | 6.31 | 4.71 | 3.27 |
| Exp-Fixer 1 | Ink K | 1.126 | 1.037 | −7.9 | 5.45 | 4.80 | 5.72 |
|  | Ink C | 1.110 | 1.033 | −6.9 | 3.28 | 2.12 | 1.81 |
| Exp-Fixer 2 | Ink K | 1.126 | 1.042 | −7.5 | 5.69 | 4.99 | 5.82 |
|  | Ink C | 1.104 | 1.028 | −6.8 | 3.38 | 2.25 | 1.86 |
| Exp-Fixer 3 | Ink K | 1.128 | 1.037 | −8.1 | 5.17 | 4.56 | 5.46 |
|  | Ink C | 1.101 | 1.041 | −5.4 | 3.28 | 2.04 | 1.79 |
| Exp-Fixer 4 | Ink K | 1.154 | 1.052 | −8.8 | 5.39 | 4.73 | 5.68 |
|  | Ink C | 1.115 | 1.040 | −6.8 | 3.26 | 2.37 | 1.75 |
| Exp-Fixer 5 | Ink K | 1.153 | 1.058 | −8.2 | 5.33 | 4.68 | 5.59 |
|  | Ink C | 1.127 | 1.040 | −7.7 | 2.91 | 1.89 | 1.61 |

TABLE 3B

Optical Density and Washfastness Durability on 100% Cotton Substrate (Knitted)

| Fixer ID (10 gsm) | Ink ID (20 gsm) | OD (0 wash) | OD (5 washes) | %ΔOD | $\Delta E_{CIE}$ | $\Delta E_{2000}$ | $\Delta E_{CMC}$ (2:1) |
|---|---|---|---|---|---|---|---|
| None | Ink K | 1.221 | 0.667 | −45.4 | 27.38 | 24.94 | 19.23 |
|  | Ink C | 1.191 | 0.636 | −46.6 | 22.11 | 17.23 | 9.98 |
| Exp-Fixer 1 | Ink K | 1.190 | 0.942 | −20.8 | 10.82 | 9.07 | 8.81 |
|  | Ink C | 1.122 | 0.913 | −18.6 | 7.36 | 5.49 | 3.36 |
| Exp-Fixer 2 | Ink K | 1.202 | 0.946 | −21.3 | 11.05 | 9.24 | 8.96 |
|  | Ink C | 1.114 | 0.955 | −14.3 | 5.91 | 4.09 | 2.71 |
| Exp-Fixer 3 | Ink K | 1.206 | 0.982 | −18.6 | 10.60 | 8.90 | 8.66 |
|  | Ink C | 1.143 | 0.944 | −17.4 | 7.19 | 4.95 | 3.19 |
| Exp-Fixer 4 | Ink K | 1.231 | 0.998 | −18.9 | 10.26 | 8.52 | 8.58 |
|  | Ink C | 1.133 | 0.987 | −12.9 | 5.40 | 3.66 | 2.52 |
| Exp-Fixer 5 | Ink K | 1.214 | 1.016 | −16.3 | 9.23 | 7.68 | 8.04 |
|  | Ink C | 1.169 | 1.050 | −10.2 | 5.23 | 3.37 | 2.46 |
| Exp-Fixer 6 | Ink K | 1.161 | 0.926 | −20.2 | 10.0 | 8.5 | 7.6 |
|  | Ink C | 1.100 | 0.978 | −11.1 | 4.6 | 3.2 | 2.2 |
| Exp-Fixer 8 | Ink K | 1.187 | 0.969 | −18.4 | 9.9 | 8.2 | 7.8 |
|  | Ink C | 1.121 | 0.965 | −13.9 | 5.0 | 3.4 | 2.3 |

As can be seen in the data presented in Tables 3A and 3B, initial optical density (OD) was substantially better on both types of cotton fabric when the fixer formulations of the present disclosure were used, compared to not using the fixer fluid. Furthermore, after 5 washes, the %ΔOD, $\Delta E_{CIE}$, $\Delta E_{200}$, and $\Delta E_{CMC}$, the black ink composition (Ink K) and the cyan ink composition (Ink C) performed better with respect to washfastness durability every instance using every washfastness metric compared to samples where a fixer fluid was not used (Table 3B). Furthermore, after 5 washes, the %ΔOD, $\Delta E_{CIE}$, $\Delta E_{200}$, and $\Delta E_{CMC}$ of the black ink composition (Ink K) performed better with respect to washfastness durability every instance using every washfastness metric compared to samples where a fixer fluid was not used (Table 3A). The cyan ink composition, on the other hand always performed better with respect to the OD metrics as well as with $\Delta E_{CIE}$ values, and performed typically comparably with respect to $\Delta E_{2000}$ and $\Delta E_{CMC}$ (2:1) values. It is notable, however, that since the optical density started lower without fixer fluid, these two ΔE metrics were not really as comparable as the numbers may indicate. Starting with lower OD, a change in certain ΔE values with a lower starting OD is not as favorable as similar ΔE values with a higher initial OD.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A fixer fluid, comprising:
 a fixer vehicle including water, an NH-type or N-alkylated lactam co-solvent, and a phosphate ester surfactant; and
 from 0.5 wt % to 12 wt % an azetidinium-containing polyamine polymer dispersed in the fixer vehicle.

2. The fixer fluid of claim 1, wherein the azetidinium-containing polyamine polymer includes from 2 to 12 carbon atoms between individual amine groups.

3. The fixer fluid of claim 1, wherein the azetidinium-containing polyamine includes from 3 to 8 carbon atoms between individual azetidinium groups and secondary or tertiary amine groups positioned along a backbone of the azetidinium-containing polyamine.

4. The fixer fluid of claim 1, wherein the fixer fluid has an initial viscosity from 1.5 cP to 15 cP at 25° C.

5. The fixer fluid of claim 1, wherein the fixer fluid has a pH from 2 to less than 7.

6. The fixer fluid of claim 1, wherein the NH-type or N-alkylated lactam co-solvent includes a C1 to C4 alkylated lactam co-solvent.

7. The fixer fluid of claim 1, wherein the phosphate ester surfactant includes a phosphate ester of a C10 to C20 alcohol, a polyethylene glycol oleyl mono phosphate, a polyethylene glycol oleyl diphosphate, an oleth-based phosphate, or a mixture thereof.

8. A fluid set for textile printing, comprising:
an ink composition including an ink vehicle, pigment, and polymeric binder; and
a fixer fluid including:
a fixer vehicle comprising water, an NH-type or N-alkylated lactam co-solvent, and a phosphate ester surfactant, and
from 0.5 wt % to 12 wt % an azetidinium-containing polyamine polymer dispersed in the fixer vehicle.

9. The fluid set of claim 8, wherein the azetidinium-containing polyamine polymer includes from 2 to 12 carbon atoms between individual amine groups.

10. The fluid set of claim 8, wherein the fixer fluid has an initial viscosity from 1.5 cP to 15 cP at 25° C. and a pH from 2 to less than 7.

11. The fluid set of claim 8, wherein:
the NH-type or N-alkylated lactam co-solvent includes the N-alkylated lactam co-solvent,
the phosphate ester surfactant includes a phosphate ester of a C10 to C20 alcohol, a polyethylene glycol oleyl mono phosphate, a polyethylene glycol oleyl diphosphate, an oleth-based phosphate, or a mixture thereof, or both.

12. The fluid set of claim 8, wherein the polymeric binder in the ink composition includes polyurethane particles, (meth)acrylic latex particles, or a combination thereof.

13. A method of textile printing, comprising:
jetting a fixer fluid onto a fabric substrate, wherein the fixer fluid comprises a fixer vehicle including water, an NH-type or N-alkylated lactam co-solvent, and a phosphate ester surfactant, wherein the fixer fluid further comprises from 0.5 wt % to 12 wt % an azetidinium-containing polyamine polymer dispersed in the fixer vehicle; and
jetting an ink composition onto the fabric substrate in contact with the fixer fluid, wherein the ink composition includes an ink vehicle, pigment, and polymeric binder.

14. The method of claim 13, further comprising heating the fabric substrate having the fixer fluid and the ink composition applied thereto to a temperature from 80° C. to 200° C. for a period from 5 seconds to 10 minutes.

15. The method of claim 13, wherein:
the NH-type or N-alkylated lactam co-solvent includes the C1 to C4 alkylated lactam co-solvent,
the phosphate ester surfactant a phosphate ester of a C10 to C20 alcohol, a polyethylene glycol oleyl mono phosphate, a polyethylene glycol oleyl diphosphate, an oleth-based phosphate, or a mixture thereof, or both.

* * * * *